United States Patent
Moseley et al.

[11] Patent Number: 5,613,578
[45] Date of Patent: Mar. 25, 1997

[54] PHASE CHANGE BRAKE DISKS

[75] Inventors: Douglas D. Moseley, Uniontown; James W. Burbick, Tallmadge, both of Ohio

[73] Assignee: Aircraft Braking Systems Corporation, Akron, Ohio

[21] Appl. No.: 170,950

[22] Filed: Dec. 21, 1993

[51] Int. Cl.$^6$ ............................................. F16D 65/853
[52] U.S. Cl. ............................ 188/218 XL; 188/251 A
[58] Field of Search ................... 188/264 CC, 218 XL, 188/251 A

[56] References Cited

U.S. PATENT DOCUMENTS

| | | | |
|---|---|---|---|
| 3,013,636 | 12/1961 | Dotto et al. | 188/264 CC |
| 3,188,961 | 6/1965 | Scruggs et al. | 188/264 CC |
| 3,208,559 | 9/1965 | Chambers et al. | 188/264 RA |
| 3,403,759 | 10/1968 | Holdcomb, Jr. | 188/218 X |
| 3,481,439 | 12/1969 | Finkin | 188/264 CC |
| 3,651,895 | 3/1972 | Whitfield | 188/71.6 |
| 4,421,661 | 12/1983 | Claar et al. | 252/70 |
| 4,512,388 | 4/1985 | Claar et al. | 165/1 |
| 5,009,291 | 4/1991 | Castellano | 188/71.6 |
| 5,139,118 | 8/1992 | Schenk | 188/264 |
| 5,143,184 | 9/1992 | Snyder et al. | 188/218 X |

FOREIGN PATENT DOCUMENTS 1096633  12/1967  United Kingdom ............ 188/264 CC

*Primary Examiner*—Matthew C. Graham
*Attorney, Agent, or Firm*—Lee A. Germain; Ray L. Weber

[57] ABSTRACT

A brake disk for an aircraft brake assembly, the assembly comprising a multi-disk stack of alternating stator and rotor brake disks wherein each disk is comprised of a carbon composite material and a specific volume of a phase change material is encapsulated within the core of the disk between its brake wear faces and distributed so as to function to enhance brake energy capacity in the operation of the brake assembly.

20 Claims, 3 Drawing Sheets

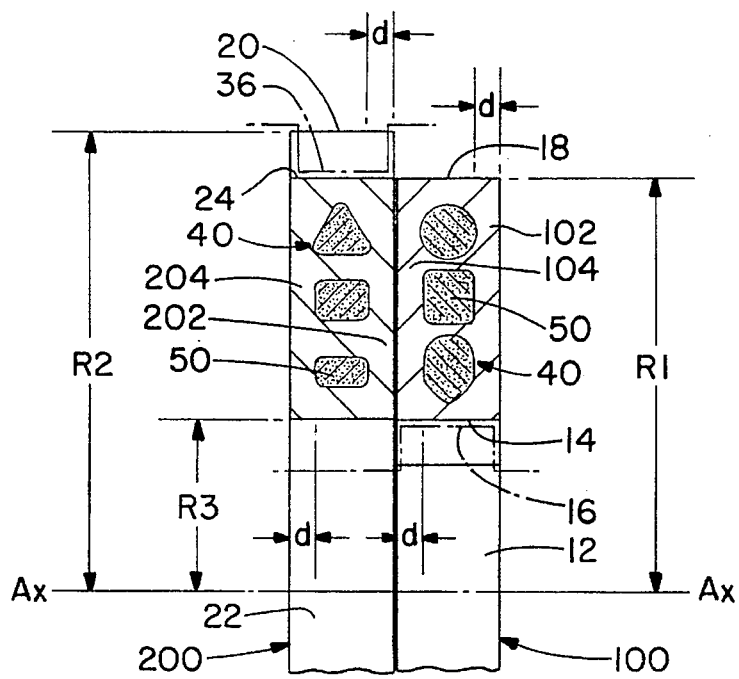
FIG.-3
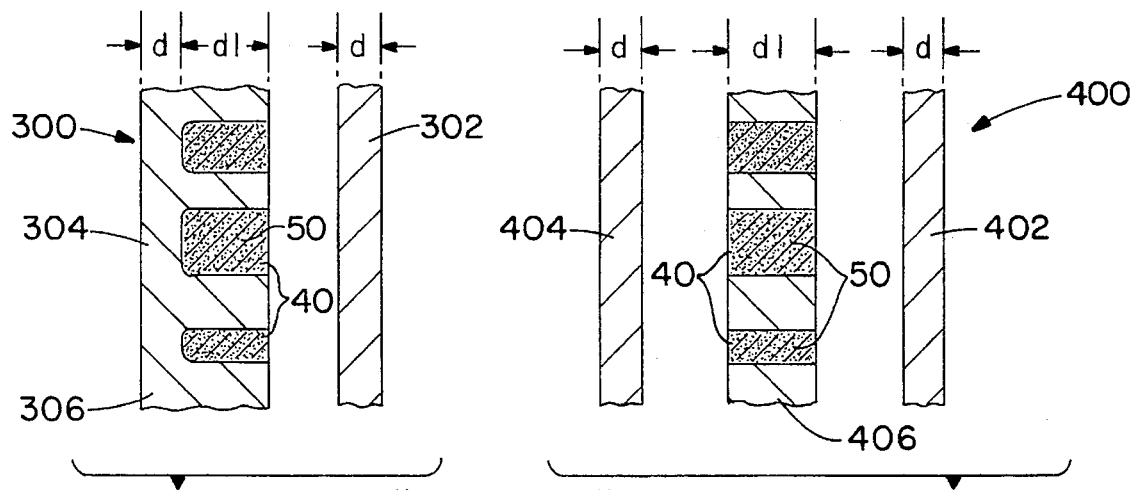
FIG.-4
FIG.-5
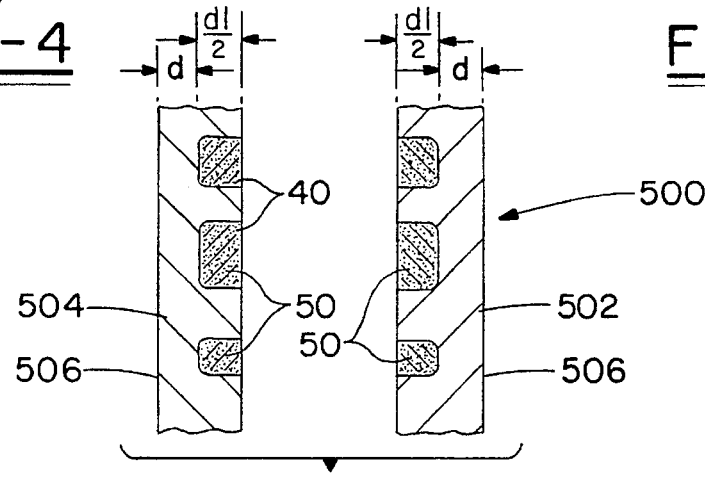
FIG.-6

5,613,578

PHASE CHANGE BRAKE DISKS

FIELD OF THE INVENTION

This invention generally pertains to brake disks as applied to aircraft multi-disk brake assemblies and, more particularly, to configurations for rotor and stator disks of a brake disk stack so as to provide enhanced brake energy capacity during braking of high speed rotating aircraft wheels.

More specifically, this invention provides a brake disk comprised of a carbon composite material having at least one particularly configured cavity within the body of composite material adapted to hold a specific volume of a phase change material which functions to absorb large quantities of heat with minimal increase in temperature when braking a high speed rotating aircraft wheel.

BACKGROUND OF THE INVENTION

Many and various type advances have been made in the wheel and brake arts and these include advances in the configurations and compositions of the wheels, the tires, and the brake disks of a wheel and brake assembly. These efforts have been particularly concentrated in the aircraft industry as advances in aircraft performance have been achieved. While modern aircraft fly faster, they also take off and land at faster speeds than their earlier counterparts and in this circumstance it has become necessary to also advance the state of the art as it pertains to wheels and brakes to insure aircraft safety.

A particular advancement in the brake art has been the development of the carbon composite brake disk which proved to provide a high degree of braking while contributing a marked reduction in the weight of an aircraft brake assembly. A particular problem remains in that very high temperatures are generated during aircraft braking and especially in an emergency braking of an aircraft. These high temperatures affect many elements of the wheel and brake assembly including structurally critical components as well as the tires and various electronic sensors which may be present to gain information of wheel and brake performance. The detrimental affect of high temperature has been so great that, when an aircraft experiences an aborted take-off due to an emergency on the aircraft, the industry considers that all of the components of the wheel and brake assembly except the axle must be scrapped for the sake of safety considerations.

To accomodate high heat sink temperatures, shielding and insulating features have been incorporated into wheel and brake designs. These features protect critical components from overheating in normal service and from heat related failure in an emergency braking situation. However, the desire of aircraft manufacturers is to continually reduce weight both structurally and in the heat sink to provide for maximum aircraft performance and payload. The present invention provides a means to reduce heat sink weight for a fixed brake energy capacity or, provides significantly increased energy absorption capacity for a fixed heat sink weight.

It is, therefore, in accordance with a primary aspect of the present invention an object to provide a configuration for a brake disk for aircraft multi-disk brake assemblies which increases brake energy capacity during braking of a high speed rotating aircraft wheel.

According to another aspect of the invention, it is an object to provide a rotor and/or stator disk of a multi-disk brake assembly which incorporates a volume of a phase change material within the disk body structure between its brake wear face surfaces such as to absorb large quantities of heat as the material changes states without being accompanied by an increase in temperature during braking action.

In accordance with another aspect of the invention it is an object to provide a brake disk having at least one cavity particularly configured within the body of the disk between its outer planar brake wear faces, which cavity is adapted to carry a volume of a phase change material therein go as to increase energy absorption capacity during braking of an aircraft wheel.

According to still another aspect of the invention it is an object to provide a brake-disk having a configuration of cavities within the body of friction material comprising the disk wherein the geometric arrangement of cavities is such as to define a structural truss configuration which maintains the structural strength characteristics of the disk, said cavities adapted to carry a specific volume of a phase change material therein for increased energy absorption capacity of the disk.

In accordance with still another aspect of the invention it is an object to provide a brake disk comprised of fully densified carbon composite material having a central annular core comprised of a vapor deposited phase change material in a low density, high strength, carbon matrix, said brake disk exhibiting high energy absorption qualities when subjected to braking action within a multi-disk brake stack of an aircraft wheel and brake assembly.

SUMMARY OF THE INVENTION

The various aspects and advantages of the invention are accomplished in a friction disk comprised of a carbon composite friction material having a volume of a phase change material encapsulated within the core of friction material between its brake wear face surfaces, the phase change material functioning to enhance brake energy capacity in the operation of the brake disk.

BRIEF DESCRIPTION OF THE DRAWINGS

The invention will be better appreciated and understood from a consideration of the following detailed description when taken in conjunction with the accompanying drawings, in the several figures in which like-reference numerals or letters are used to indicate like parts, elements, or members and wherein:

FIG. 3 is a cross-sectional view through one-half of a stator disk and an associated rotor disk as these are mounted in alternating sequence within a brake disk stack;

FIG. 4 is a partial edge elevational view, in cross-section, of a brake disk illustrating a first fabricating configuration applicable to this invention;

FIG. 5 is a partial edge elevational view in cross-section, of a brake disk illustrating a second fabricating configuration applicable to this invention;

FIG. 6 is a partial edge elevational view, in cross-section, of a brake disk illustrating a third fabricating configuration applicable to this invention;

DETAILED DESCRIPTION OF THE PREFERRED EMBODIMENTS

Figure 1:
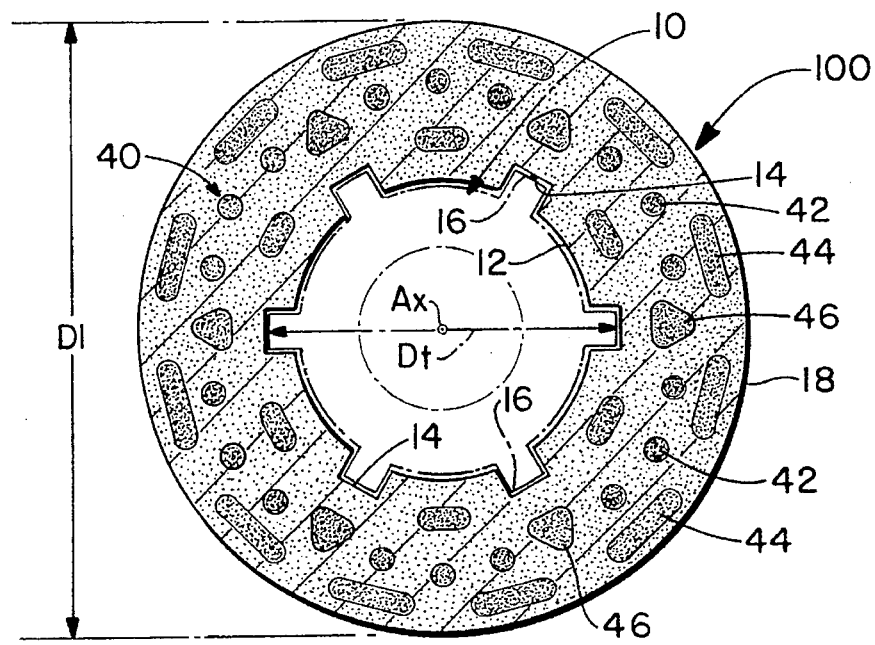
FIG. 1 is a plan view of a brake disk showing the inner core of the disk which has been modified in accordance with the invention, the disk being a stator disk as may be applied to a multi-disk stack of brake disks comprising an aircraft brake assembly.

Referring to the drawings, FIG. 1 is a plan view of a brake disk generally indicated by reference numeral 100 which has been modified to meet the needs of the invention. The brake disk 100 comprises a stator disk as may be found in a stack of disks which make up the frictional braking elements of a wheel and brake assembly wherein the central axis of the assembly is indicated at Ax in the figure.

Figure 2:
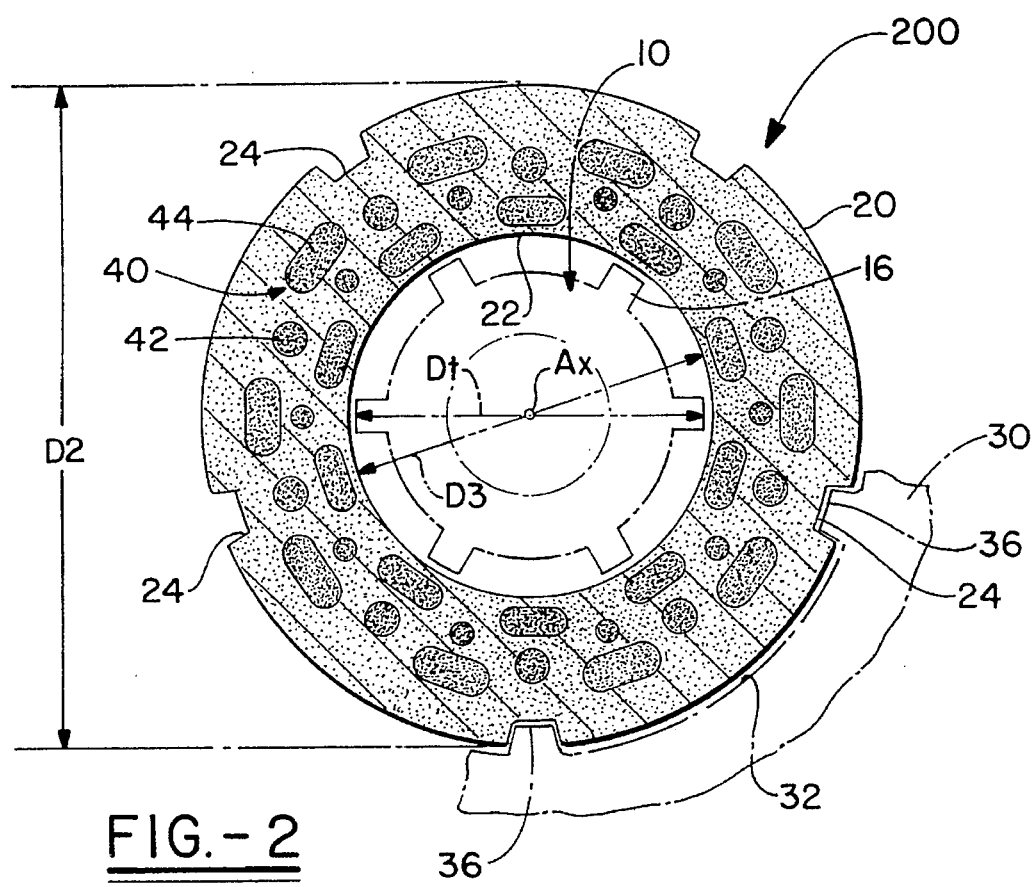
FIG. 2 is a plan view of a rotor brake disk which has been modified in accordance with the invention and which may be mounted in alternating sequence with stator disks as shown in FIG. 1.

FIG. 2 is also a plan view of a brake disk generally indicated at reference numeral 200 which has been modified in accordance with the invention and it comprises a rotor disk within the brake disk stack, the disks 100 and 200 comprising alternating ones of the brake disk stack.

The brake disks 100 and 200 are carried on or about a torque tube 10 which comprises a primary functioning member of the wheel and brake assembly and it is mounted to a brake housing (not shown) and in axial position with respect to a wheel axle (not shown) so as to be relatively stationary with respect to any rotating elements of the wheel and brake assembly.

Conventionally, the stator disks 100 may be characterized by an axial through-bore 12 which is configured with a number of radially extending keyways 14 that are shaped for engagement with a like number of radially extending drive keys 16 configured into the outer peripheral surface of the torque tube 10. In this manner, the stator disks 100 are maintained relatively stationary with the torque tube, i.e., they cannot rotate about the Ax axis. The stator disks are also characterized by an overall outside diameter D1 that is less than the overall outside diameter D2 of the rotor disks 200 by an amount which is slightly greater than the radial depth of a plurality of keyways 24 configured into the outside peripheral edge of the rotor disks 200. The keyways 24 are shaped for engagement with a like plurality of drive keys 36 which are configured into a bore 32 of a wheel 30 which is mounted for rotational motion about the Ax axis. Thus, the rotor disks 200 may rotate with the wheel 30. The rotor disks 200 are also characterized by a through-bore 22 exhibiting a diameter D3 which is slightly greater than the diameter Dt of the torque tube 10 as such diameter may be measured between the radial extents of two oppositely opposed and located drive keys 16 of the torque tube. A rotor disk 200 may thus rotate about the torque tube 10 without any interference between it and the torque tube drive keys 16.

From the above description of the stator disks 100 and the rotor disks 200 it will be recognized that, when the disks are positioned in alternating sequence within a brake assembly, an annular brake wear surface area exists which is common to both stator and rotor disks. For example, the annular brake wear surface area of a stator disk 100 is defined by the diameter difference D1–D3, i.e., the outside diameter D1 of a disk 100 and the through-bore diameter D3 of a disk 200. Alternatively, the annular brake wear surface area of a disk. 200 is also defined by the diameter difference D1–D3 and both stator and rotor disks 100,200 exhibit annular wear surface areas which are in axial registration one with respect to the other. In other words, when the stator and rotor disks are in alternating sequence within a brake disk stack of these elements, an annular inboardly-facing frictional wear surface area of one disk will be positioned for braking engagement with an annular outboardly-facing frictional wear surface of a disk adjacent to it.

It will be recognized by persons knowledgeable in this art that the foregoing description is only a generalized one as it pertains to the mounting and engagement arrangements of the stator and rotor disks of a multi-disk brake assembly. For example, the drive key and keyway positions will conventionally include various types of reinforcement elements as these may be affixed to the peripheral edges of carbon disks to maintain the strength integrity in the areas of the drive key and keyway engagements. Such reinforcements are within the prior art and have not been shown or described because they do not affect the present invention in any way. The present invention, therefore, is not considered limited in scope by any particular key and/or keyway reinforcements which may be applied to either of the stator and/or rotor disks as modified by this invention.

Continuing with reference to FIGS. 1 and 2, the stator and rotor disks 100,200 are illustrated as these may be modified to include a plurality of pockets, recesses, or cavities which are generally indicated by reference numeral 40 in the drawings. The cavities 40 are located primarily within the bounds defined for the annular brake wear surface areas of the disks which is the difference diameters D1–D3.

Figure 8:
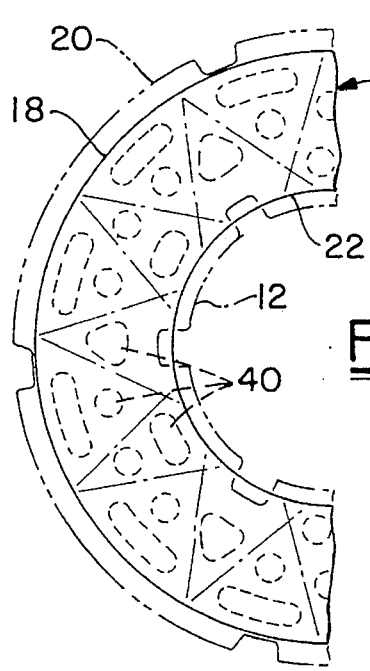
FIG. 8 is a partial plan view of a brake disk illustrating a truss structural configuration of the inner core which is applicable to both stator and rotor disks.

The cavities 40 exhibit various geometric shapes which may include circular shapes 42, oval shapes 44, and/or triangular shapes 46. These shapes may be applied singly or in various combinations so as to maintain the strength integrity of the carbon compsite material which comprises the disk structure. For example and referring to FIG. 8 of the drawings, it can be seen and appreciated from the figure that a truss configuration of carbon composite material exists which links the inner peripheral edge 12 of a stator disk 100 with the outer peripheral edge 18 of the disk. The same truss configuration exists within a rotor disk 200 and these link the inner peripheral edge 22 with the outer peripheral edge 20. This truss configuration may be applied when the cavities 40 are numerous and of a small size as illustrated. However, when the cavity is of a much larger size and covers a continuous areal extent of the disk surface then disk strengthening may be accomplished via another means which will be described in more detail hereinafter. In any event, the cavities 40 may be configured into a carbon composite brake disk using various well-known machine processes which may include mold-forming, machining, and/or drilling techniques.

The cavities 40 function to encapsulate a specific amount or volume of a phase change material within the core of the disk and particularly between the brake wear faces of the disk and within the annular area as established by the diameter difference D1–D3. The phase change material will function to absorb the high energy and thus the heat generated in the braking of a high speed rotating wheel as the stators 100 and rotors 200 come into contacting engagement for braking action of a high speed wheel.

It should be understood that the showings of the brake disks 100 and 200 in FIGS. 1 and 2 are not complete in that the frictional wear faces are not shown. The brake wear faces are comprised of densified carbon composite material which is substantially continuous about the annular extent of the disks. The wear faces are not shown in the figures so as to facilitate the description as it pertains to the particular arrangement and configurations of the cavities 40.

Referring now also to FIG. 3 of the drawings, a one-half portion of the disks 100 and 200 is illustrated in a cross-sectional view as these disks may be positioned in planar face-to-face contacting engagement within a brake disk stack assembly. In the drawing, the radii R1, R2, and R3 correspond to the disk diameters D1, D2, and D3 shown in FIGS. 1 and 2. From this illustration it may be appreciated that the brake wear surface areas may also be defined by the radii difference expressed by R1–R3 where R1 is the distance from the axial center Ax to the radial limit extent of the disk 100 and R3 is the distance from the axial center Ax to the radial limit extents of (i) the bore 22 of disk 200 or, (ii) the keyways 14 of the disk 100. Of course and as hereinbefore stated, the brake wear surface areas are annular about the circumferential extent of the disks 100 and/or 200.

It can be appreciated from the showing of FIG. 3 that the cavities 40 are substantially within the main body portion of each of the disks 100,200 and not within the thickness of the brake wear surfaces as this dimension is indicated at "d" in the figure. Thus, it can be seen that the phase change material which is indicated at reference numeral 50, may be encapsulated within the core of the disk body by the outer frictional wear faces of the disks. For example, the stator disk 100 may exhibit an outboardly-positioned wear face 102 and an inboardly-positioned wear face 104 and, prior to any occurance of brake wear, the thickness dimension of each will be equal to "d" as indicated in the drawing. Similarly, a rotor disk 200 may exhibit an outboardly-positioned wear face 202 and an inboardly-positioned wear face 204 and, prior to any occurance of brake wear, these will each have a thickness dimension "d". From this it can be seen that the outboardly wear face 202 of a rotor disk 200 will be in frictional contacting engagement with the inboardly wear face 104 of a stator disk 100 when braking of the wheel-keyed rotor disk 200 is being effected.

The stator and rotor brake disks 100,200 may be fabricated in various ways and using methods and/or techniques which are well-known in the industry. The disks 100,200 may be fabricated to include volumes of phase change material within the disk core as illustrated in FIGS. 4, 5, and 6 and this may be done irrespective of whether it is a stator or a rotor disk.

Referring to FIG. 4 of the drawings, a brake disk is shown in a partial cross-sectional view and as an assembly which is generally indicated by reference numeral 300. The brake disk may be fabricated by first manufacturing a central body portion 306 comprised of densified carbon composite material and characterized by a brake wear face 304 and a plurality of axially oriented cavities 40 formed in the body 306 in a molding process or milled or drilled therein using any of these well-known methods. The cavities 40 may then be filled with a proper volume of a phase change material 50 which is encapsulated within the body 306 by an outer brake wear face disk 302. The disk 302 is bonded to the body 306 by any of the known techniques to produce a single integral brake disk. Accordingly and for the sake of example only, the brake disk wear faces 302 and 304 may each exhibit a thickness dimension "d" while the depth dimension of each cavity 40 may be equal to "d1" as shown. The total thickness dimension of the integral disk 300 will therefore be equal to "2d+d1".

Referring now to FIG. 5 of the drawings, a brake disk in accordance with this invention may also be fabricated as illustrated by the cross-sectional elevational view and generally indicated by reference numeral 400. The brake disk 400 comprises a body portion 406 which is manufactured by conventional techniques to a thickness dimension "d1" as illustrated. The disk 406 may be mold-formed, milled, or drilled to produce a number of through-bores or cavities 40 which may then be filled with a proper volume of a phase change material 50. A pair of brake wear face disks 402 and 404 are also made in conventional manner and these are bonded to the disk 406 to produce a single integral brake disk 400. The brake wear face disks 402 and 404 may each exhibit a thickness dimension "d" and the overall thickness dimension of the disk 400 will, therefore, be equal to "2d+d1" which corresponds to the disk 300 made according to the showing of FIG. 4.

Referring now to FIG. 6 of the drawings, another method of fabricating a brake disk in accordance with the invention is illustrated in a partial cross-sectional view and it will comprise an assembly generally indicated by reference numeral 500. The disk 500 comprises identical body portions 506 having respective brake wear faces 502 and 504 and each face exhibits a thickness dimension "d" as indicated in the drawing. The body portions 506 each have a thickness dimension of ½(d1) and these are characterized by cavities 40 which are filled with a proper volume of a phase change material 50. The two bodies 506 are bonded together in face-to-face relationship to form an integral brake disk 500 which has a total thickness dimension of "2d+d1". It will, of course, be recognized that the two body portions 506 may or may not be identical because it is not necessary that the cavities be in complete registration between the two. It is only required that a sufficient bonding surface exist between the two body halves such as to form the integral brake disk 500.

As hereinbefore alluded to, the brake disks 300, 400, and 500 may be fabricated as either stator or rotor disks of a brake stack assembly and these may also be made to meet various diameter and thickness dimensions depending upon the particular brake assembly design and/or application. In addition, the disks may or may not exhibit the same thickness dimensions as these may be variable within the same brake disk stack, and this, irrespective of whether a disk is a stator disk or a rotor disk.

With respect to the phase change material 50 which is encapsulated within the cavities 40 of the disk assemblies 300, 400, and/or 500, it was found that the material must meet various specifications which are necessary in an aircraft braking application. Primarily, the phase change material must exhibit a high heat of fusion and have a melting point applicable to the temperatures typically generated in aircraft brake applications. For example, peak brake disk temperatures will typically range from about 500° F. to 1500° F. in normal use and may exceed 3000° F. for the highest energy generated in an aborted take-off situation. The phase change from a solid to a liquid is generally desired at a high temperature as the brake disks are reaching a limit of energy absorption, or at a specific disk temperature to prevent exceeding a temperature limit for the surrounding wheel and brake structure including the aircraft tires and strut assembly. Generally, this will lead to a desired phase change material melting point in the range of 1000° F. to 3000° F. depending upon the specific operation of a particular aircraft. Additionally, the boiling point of the phase change material 50 must be considered. This provides another phase change transition and an associated large energy absorption capability. It also raises concerns with respect to the generation of high vapor pressures and a potential release of these vapors into the atmosphere. Toxicity of the vapors must be considered, especially with relatively low boiling point phase change materials.

The phase change material 50 must be chemically compatible with the carbon composite forming the structural brake disk or be encapsulated within the carbon composite such that any type of contamination from the various sources does not occur. Ideally, the phase change material would not require complete isolation from the carbon composite and would not be chemically reactive with limited exposure to diffusion of the various fluids and/or solvents which may be found in the aircraft type environment. Some of the fluids and solvents to which an aircraft brake assembly may be exposed include de-icing fluids, cleaning fluids or solvents, Water and/or water vapor, and aircraft hydraulic fluids and greases. Suitable phase change type materials are known in the arts and some of these will exhibit melting points within the range of 1000° F. to 3000° F. A particular phase change material which was found to work in this type of application is a lithium fluoride compound (LiF) which, in a substantially fine crystaline powder form and high purity, will exhibit a melting point at about 850° C. and a boiling point at about 1750° C. (approx. 1500° F. and 3200° F.).

It will be recognized by those persons who are knowledgeable of phase change materials that expansion of the material must be allowed for within the cavities 40. Thus, it was to be determined that a void fraction should exist with respect to the total cavity capacity so as to accomodate phase change material expansion when fabricating the brake disks 300, 400, and 500 shown in FIGS. 4, 5, and 6 of the drawings. It was determined that the volume fraction of phase change material should preferably be within the range of 10% to 95% and this will depend upon the particular phase change material and whether the cavities 40 also contain other materials.

In order to (i) maintain an even distribution of phase change material 50 within the cavities 40 and (ii) increase the heat transfer through the phase change material, a containment mechanism may be provided within the cavities 40. The particular type of mechanism is not a limiting factor of this invention, however, preferably it will comprise a honeycomb type structure which also provides some structural integrity of the brake disk in the areas of the cavities.

Figure 7:
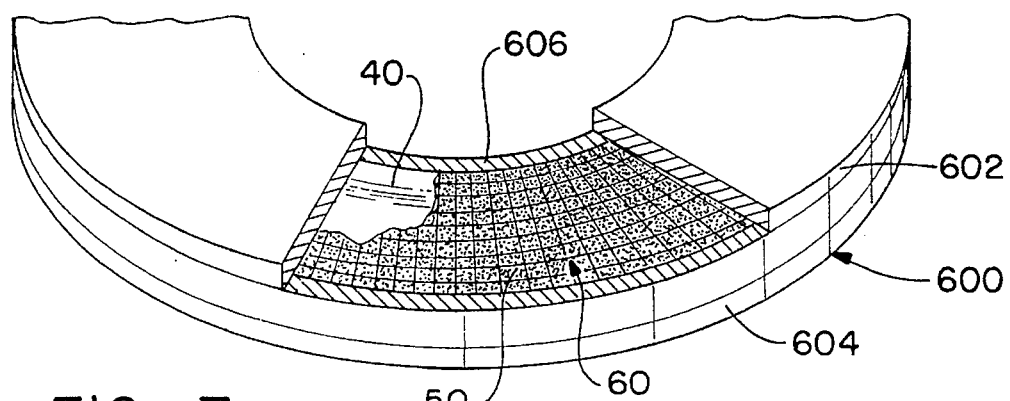
FIG. 7 is a partial perspective view, with parts broken away, of a brake disk illustrating a fourth fabricating configuration applicable to this invention.

Referring now also to FIG. 7 of the drawings, a partial perspective view of a brake disk is illustrated and generally indicated by reference numeral 600. The disk 600 is partially broken away to show the inner core of carbon composite material 606 which has an annular cavity 40 and brake wear face disks 602 and 604 as these may be provided by way of any of the techniques or methods described and illustrated with respect to FIGS. 4, 5, and 6 of the drawings. The brake disk 600 may be either a stator disk or a rotor disk and, therefore, the keyways which are conventionally associated with either disk are not shown in the figure. It can be seen that, because the cavity 40 exhibits an annular shape within the disk core, no truss-like structural configuration exists between the inner and outer rings of the disk. In this case, a containment mechanism 60 may be provided which is shaped to conform to the annular cavity shape. The containment mechanism 60 may comprise any type of high strength carbon matrix material and/or honeycomb type structure and its interstices are filled with the proper volume of phase change material. From this it should be appreciated that a more even distribution and precise volume of phase change material can be realized by way of the containment mechanism 60. A particular material for the mechanism may be a pyrolytic graphite known by the tradename GRAFOIL as such is produced by the Union Carbide Corporation. The GRAFOIL may be easily shaped to conform to various cavity shapes 40 and it provides directional high thermal conductivity necessary for this type of brake application.

Figure 9:
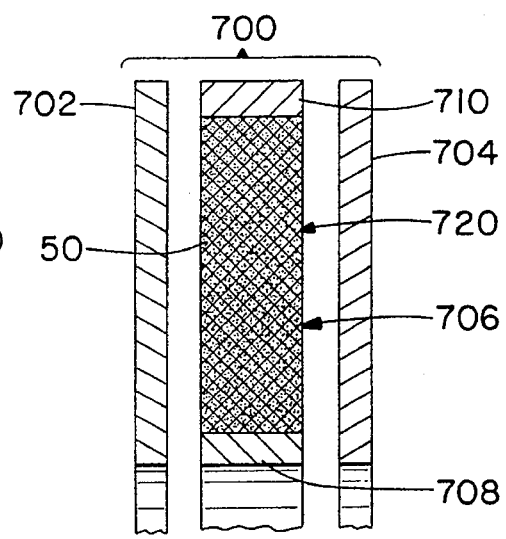
FIG. 9 is a partial edge elevational view, in cross-section, of a brake disk illustrating an alternative embodiment of the invention.

Referring now to FIG. 9 of the drawings, an alternative embodiment of the invention is illustrated by way of a partial edge elevational view similar to FIGS. 4–6 which comprises a brake disk generally indicated by reference numeral 700. The disk 700 comprises a core portion 706 and a pair of brake wear face disks 702 and 704. In contrast to the fabricating techniques illustrated in FIGS. 4–6, the disk 700 has a core 706 comprised of an inner ring 708 of densified carbon composite material and an outer ring 710 of densified carbon composite material and these encapsulate a continuous ring 720 comprised of a low density, high strength matrix having a phase change material 50 vapor-deposited within the interstices of the matrix. The matrix ring 720 is completely encapsulated within densified carbon composite material as provided by the rings 708,710 and the brake wear face disks 702,704. The advantages of this disk configuration reside in the fact that mold-forming or machining or drilling are eliminated in cavity formation and that various carbon, ceramic, or other fiber materials may be used to fabricate the core 706 for various disk sizes and/or applications.

Figure 10:
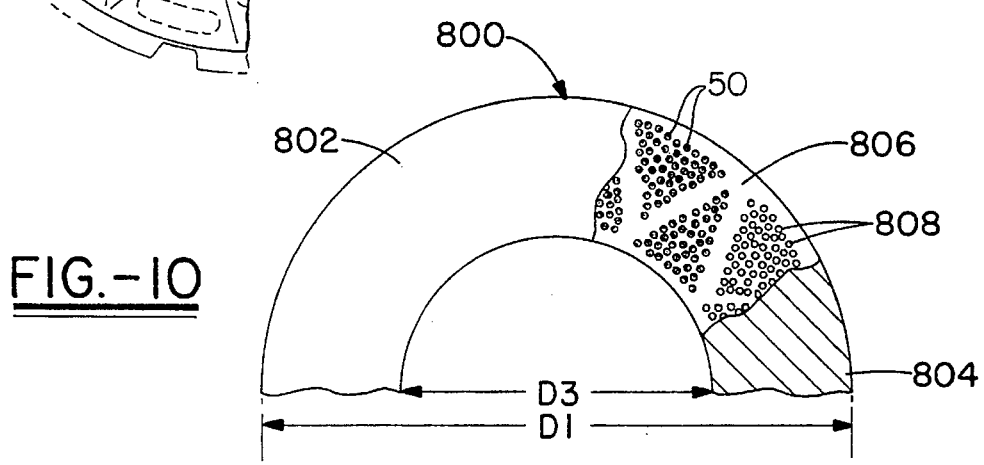
FIG. 10 is a partial plan view, with parts broken away, of a brake disk illustrating another embodiment of the invention.

Referring to FIG. 10 of the drawings, an alternative brake disk embodiment of the invention is illustrated and generally indicated by reference numeral 800. Because the brake disk 800 may be either a stator or a rotor disk of a disk stack assembly, the keyways which characterize each of these type of disks are not shown but only the brake wear face area as this is common to both type of disks and which may be defined by the difference in diameters D1–D3 as this was described with respect to FIGS. 1 and 2.

The brake disk 800 comprises a central core 806 of a densified carbon composite material which has been modified with a plurality of through-bores 808. The bores 808 are preferably arranged in a pattern which describes a truss structural configuration of the core 806 which may be similar to that shown in FIG. 8 of the drawings. The truss pattern maintains the structural integrity of the brake disk in its intended application. Each of the bores 808 carries a specific volume of a phase change material 50 which volume is determined by the number of through-bores 808, their diameters, and the type of phase change material used. The bores 808 may all be of the same diameter or they may be of different diameters but preferably they will be of a small diameter dimension such that a fine granular phase change material 50 will be maintained within each bore by mere frictional contact as beteen the phase change granules and the carbon composite material which serves as the carrier.

The core 806 is finished with brake wear face disks 802 and 804 which are bonded to the core via any of the known methods and/or techniques. The face disks 802 and 804 will function to encapsulate the phase change material 50 within the central core of the brake disk. In this configuration, it is anticipated that no type of containment mechanism 60 will be required. It will, of course, be recognized that the brake disk 800 may be fabricated in accordance with any of the techniques described with respect to FIGS. 4–6 of the drawings and that the through-bores 808 may be mold-formed, machined, or drilled into the central core portion 806 and to any desired arrangement and/or geometric configuration.

Finally and referring again to FIGS. 1–3 of the drawings, it is anticipated that one may configure the various cavity geometries 40 into a disk core in both the axial and planar directions of the disk. While FIGS. 1 and 2 show the various cavity shapes in the axial direction, FIG. 3 shows various cavity geometries in the planar direction. An advantage in shaping the cavities in the planar direction is illustrated by way of the tapered cavities 40 which leave more densified carbon composite material in the areas of the keyways 16 of the stator disk 100 and the keyways 24 of the rotor disk 200. Very clearly, the various cavity formations may be done to obtain the maximum fill volume of phase change material within a disk core without sacrificing the structural integrity of the disk. In addition, the various phase change materials which may be applied will be made on the basis of the material melting point, heat of fusion, surface tension, viscosity, vapor pressure, volume change on fusion, thermal expansion, and chemical compatibility with the carbon composite material which comprises the support structure or carrier for the phase change material.

While certain representative embodiments and details have been shown for the purpose of illustrating the present invention, it will be apparent to those skilled in the art that various changes and/or modifications may be made therein without departing from the spirit or scope of the invention.

What is claimed is:

1. A brake disk for an aircraft multi-disk brake assembly, the brake disk having opposing parallel planar brake wear faces for engagement with associated brake wear faces of other disks of the assembly and comprised of a densified carbon composite material having a specific volume of a phase change material encapsulated in axially oriented cavities within a central core portion and completely internally within the composite material between the brake wear faces, said phase change material comprising 10%–95% of the available volume space within the central core portion between the parallel brake wear faces and the arrangement of said cavities defines a structural configuration for maintaining the strength integrity of the brake disk and said core portion includes a means for containing and maintaining the distribution of the phase change material to increase heat energy conduction into the phase change material for enhanced heat energy absorption in the operation of the brake disk.

2. The brake disk as claimed in claim 1 wherein the phase change material is carried within a plurality of axially oriented cavities exhibiting varying geometric shapes within the central core portion of the disk.

3. The brake disk as claimed in claim 1 wherein the containment mechanism means for containing comprises a honeycomb structural configuration of a pyrolytic carbon.

4. The brake disk as claimed in claim 1 wherein the cavities comprise a plurality of small diameter drilled bores which each contain a specific volume of a finely granulated phase change material.

5. The brake disk as claimed in claim 1 wherein the disk is integrally fabricated and comprises a first disk of densified carbon composite material having an axial thickness dimension of "d+d1" in which "d" is the axial thickness dimension of a brake wear face and "d1" is the axial thickness dimension of a central core portion which contains the phase change material and, a second disk of densified carbon composite material having an axial thickness dimension of "d" which is bonded to the central core portion to provide the opposing parallel planar brake wear face of the integrally fabricated brake disk which exhibits a total thickness dimension of "2d+d1".

6. The brake disk as claimed in claim 1 wherein the disk is integrally fabricated and comprises a central core portion having an axial thickness dimension of "d1" and which contains the phase change material therein and, a pair of brake wear face disks each having an axial thickness dimension of "d" and these are bonded to the central core portion to form the integrally fabricated brake disk which exhibits a total thickness dimension of "2d+d1".

7. The brake disk as claimed in claim 1 wherein the disk is integrally fabricated and comprises a first disk having a brake wear face of axial dimension "d" and a central core portion of axial dimension "d½" and, a second disk having a brake wear face of axial dimension "d" and a central core portion of axial dimension "d½", said first and second disks being bonded together via their central core portions to integrally form the brake disk exhibiting an overall axial thickness dimension of "2d+d1".

8. The brake disk as claimed in claim 1 wherein the phase change material is carried within an annular-shaped cavity within the central core portion between the parallel brake wear faces and maintained therein via a containment mechanism comprised of a high-conductivity pyrolytic carbon which maintains an even distribution of the phase change material within the cavity and provides heat penetration throughout the phase change material in the operation of the brake disk.

9. The brake disk as claimed in claim 8 wherein the containment mechanism comprises a honeycomb configuration of pyrolytic carbon.

10. The brake disk as claimed in claim 1 wherein the phase change material comprises a lithium flouride (LiF) compound at a 40–90% volume fraction of the available volume of the cavities.

11. An improvement in Brake disks for an aircraft wheel and brake assembly, the assembly comprised of a multi-disk stack of frictional braking disks of a densified carbon composite material wherein alternating ones are stator disks keyed for non-rotation with a torque tube while other alternating ones are rotor disks keyed for rotation with the aircraft wheel, the stator and rotor disks effecting braking of the wheel by frictional contacting engagement of their planar brake wear faces as these are defined by the outside diameter "D1" of the stator disks and an inside bore diameter "D3" of the rotor disks, the improvement in both stator and/or rotor disks comprising in combination:

a central core of densified carbon composite material having a plurality of cavities configured in a truss structural configuration and axially into the composite in an arrangement within the annular brake wear face area as defined by the difference diameters "D1–D3";

a specific volume of finely grannulated phase change material occupying 10–95% of the available volume space within each cavity and distributed by a honeycomb-configured mechanism of high conductivity material which maintains a substantially even distribution of the phase change material contained within each of the plurality of cavities to enhance heat conduction into the phase change material; and a brake wear face disk of densified carbon composite material on either side of the central core to effect encapsulation of the phase change material within an integral brake disk formed by the central core and brake wear face disks.

12. The improvement in brake disks as claimed in claim 11 wherein the cavities comprise a plurality of geometric shapes including circular, triangular, and oblong configurations and each cavity has a containment mechanism of high conductivity pyrolytic carbon contained therein which maintains a substantially even distribution of the phase change material.

13. The improvement in brake disks as claimed in claim 11 wherein the disk comprises a first member having an axial thickness dimension "d+d1" and a second member of axial thckness dimension "d" wherein the first member comprises a central core portion having an integral brake wear face disk and the second member comprises an opposing integrally bonded brake wear face disk.

14. The improvement in brake disks as claimed in claim 11 wherein the disk comprises a first member having an axial thickness dimension "d1" and a pair of second members each having an axial thickness dimension "d" wherein the first member comprises a central core portion and the second members each comprise a brake wear face disk integrally bonded to the core portion.

15. The improvement in brake disks as claimed in claim 11 wherein the disk comprises a first member having an axial thickness dimension "d+d½" and a second member having an axial thickness dimension "d+d½" wherein "d½" is the axial thickness dimension of a central core portion and "d" is the axial thickness dimension of a brake wear face disk of each of the first and second members which are integrally bonded together to form the brake disk.

16. The improvement in brake disks as claimed in claim 11 wherein the phase change material comprises a lithium flouride compound (LiF).

17. The improvement in brake disks as claimed in claim 11 wherein the plurality of cavities each comprise a small diameter drilled bore and the bores are in an arrangement which defines a truss structural configuration within the brake wear face area of the central core.

18. An improvement in brake disks for an aircraft wheel and brake assembly, the assembly comprised of a multi-disk stack of frictional braking disks of densified carbon composite material wherein alternating ones are stator disks keyed for non-rotation with a torque tube while other alternating ones are rotor disks keyed for rotation with the aircraft wheel, the stator and rotor disks effecting braking of the wheel by frictional contacting engagement of their planar brake wear faces as these are defined by the outside diameter "D1" of the stator disks and an inside bore diameter "D3" of the rotor disks, the improvement in either of the stator or rotor disks comprising in combination:

a central core comprising (i) an inner ring of a densified carbon composite material which defines a central axial bore of the brake disk, (ii) an outer ring of a densified carbon conposite material which defines an outer peripheral extent of the disk, and (iii) an intermediate ring between the inner and outer rings comprised of a low density and high strength matrix material;

a phase change material vapor-deposited on and within the interstices of the matrix material; and a brake wear face disk of a densified carbon composite material on either side of the central core to effect encapsulation of the low density and high strength matrix and phase change materials.

19. The improvement in brake disks as claimed in claim 18 wherein the intermediate ring of the central core is defined by the difference diameters "D1–D3".

20. The improvement in brake disks as claimed in claim 18 wherein the matrix comprises a carbon material.

\* \* \* \* \*